Figure 1:
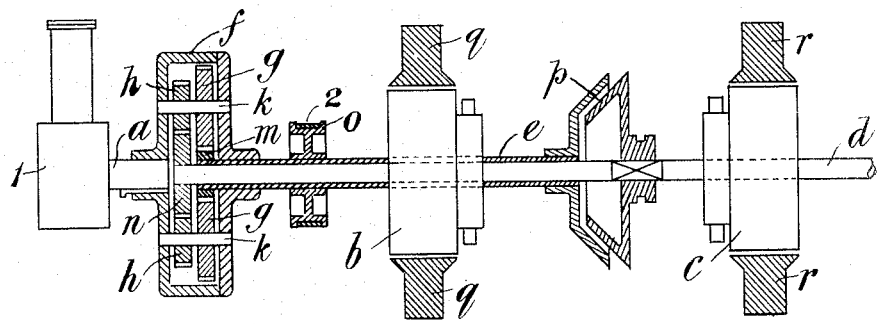

J. G. P. THOMAS.
POWER TRANSMISSION.
APPLICATION FILED NOV. 5, 1908.

948,436.

Patented Feb. 8, 1910.

Witnesses:

Inventor
John Godfrey Parry Thomas
per
Attorney

UNITED STATES PATENT OFFICE.

JOHN GODFREY PARRY THOMAS, OF HOLYWELL, ENGLAND.

POWER TRANSMISSION.

948,436.  Specification of Letters Patent.  Patented Feb. 8, 1910.

Application filed November 5, 1908. Serial No. 461,204.

*To all whom it may concern:*

Be it known that I, JOHN GODFREY PARRY THOMAS, electrical engineer, a subject of the King of Great Britain, residing at The Vicarage, Holywell, in the county of Flint, England, have invented new and useful Improvements in Power Transmission, of which the following is a specification.

This invention relates to those electro-mechanical systems for the transmission of power, in which a prime motor and two dynamo electric machines are mechanically interconnected through three members of a gearing so that the speed of each machine is determined by the relative speeds of the remaining two; and the object of the invention is the provision of the requisite members and means of control for the production of a system which allows of a wide range of speed variation by the use of the dynamo electric machines first as generator and motor and afterward as motor and generator respectively, and permits also the attainment of a purely mechanical drive at the top speed, with a resulting increase in efficiency and reduction in the requisite size of the dynamos. To this end the three machines are joined, according to the present invention, through the members of a double epicyclic gearing of the two-member type; the prime motor is arranged to drive the cage bearing the pinions on which planet wheels rotate, and of the two sun wheels which gear with the respective sets of planet wheels the larger is mounted on the shaft which drives the load shaft and which carries the armature of one of the dynamos, while the smaller is upon the shaft of the remaining dynamo. It is necessary that the gear wheels should not differ so much in size that when the larger sun wheel is stationary the smaller has to rotate at an excessive speed; conveniently the sizes may be made such that the speed of the smaller sun wheel under this condition is equal to that of the prime motor (though of course opposite in direction), for this is the speed at which all the parts must rotate for the direct drive, and the machines then need only be designed to run at this rate as a maximum speed.

Among earlier systems of this general type one employs gearing which gives unfavorably high speeds for the dynamos, and is such that the attainment of a direct mechanical drive would be possible only at a speed much below the normal or top speed. In another system in which the difficulty of the relative speeds of the machines has been overcome, there is no means for reversing the action of the electrical machines as is necessary to obtain a large range of speeds. As above indicated the system hereinafter described both affords a mechanical drive on the highest speed—with important resulting advantages—and fully utilizes the capabilities of the electrical combination for giving a great variation of speed.

The invention is illustrated in the accompanying drawings in which—

Figure 2:
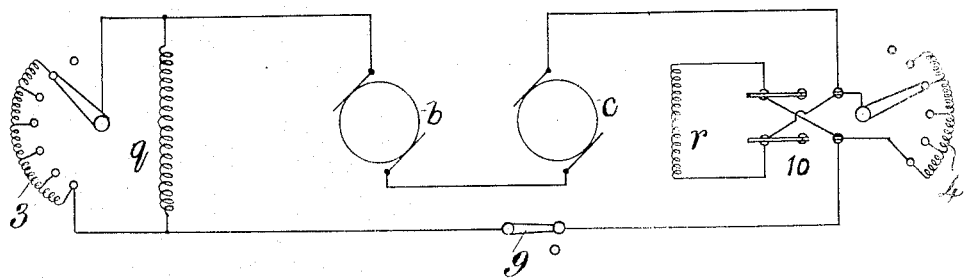

Figure 1 shows a diagrammatic section of the transmission mechanism as applied to a self-propelled road vehicle, and Fig. 2 is a diagram of the electrical connections.

From this drawing it may be seen that the shaft $a$ of the prime motor 1 drives the armatures $b$ and $c$—of which the latter is secured to the shaft $d$ connected with the road wheels, and the former to a sleeve $e$ surrounding this shaft—through gearing contained in the form illustrated, within the fly wheel $f$. This gearing, according to the present invention, comprises two sets of planet pinions of different sizes $g$ $g$ the larger and $h$ $h$ the smaller, keyed upon common axles $k$ $k$ which are secured within the fly wheel $f$. These pinions $g$ $g$ and $h$ $h$ gear respectively with sun wheels $m$ and $n$, the former secured to the sleeve $e$ and the latter to the shaft $d$. On the sleeve $e$ there may be mounted a drum or other device $o$, forming part of a brake mechanism by which the sleeve may be kept stationary, and coöperating to this end with the brake band 2. At the end of the sleeve is one member of a clutch, preferably a friction clutch $p$, which is a means of connecting shafts $d$ and $e$. The field in which the armature $b$ rotates is produced by the magnets $q$, and that for the armature $c$ by the magnets $r$. These magnets are excited by a current derived from the armatures, as indicated in Fig. 2, or from an independent source, the machines being series wound or separately excited and means are provided for varying the strength of fields by the use of shunts 3, 4 to the magnet windings $q$, $r$. The armature windings $b$, $c$ are electrically connected, a switch 9 serving to break the connection. The switch 10 serves for reversing the field $r$. In actual practice the various separate switches shown on the diagram are of course embodied in controlling devices of suitable form adapted to vary all the connections as desired.

On starting the prime motor the magnets $q$ are left unexcited; consequently, the resistance to the motion of the vehicle holding the sun wheel $n$ stationary, the rotation of the shaft $a$ and fly-wheel $f$, communicated through the planet pinions, sets the sun wheel $m$ and armature $b$ in rotation. The field $q$ is then gradually excited, and the current generated in the armature $b$ is led into the armature $c$, the field $r$ of which is fully excited. Two causes then combine to set the vehicle wheels in motion; the current in the armature $b$ sets up a torque tending to stop the rotation of the gear wheel $m$, and this torque is transmitted through the gear wheels $m$, $g$, $h$, $n$ to the shaft $d$; and also this current flowing into the armature $c$ sets up a torque between the armature $c$ and its strong field $r$, which is directly communicated to the shaft $d$. As the vehicle gains speed a back electromotive force is set up in the armature $c$ which tends to stop the current flowing from the armature $b$; to lessen this action, the field $r$ is gradually diminished. By this means a condition is reached in which the armature $b$ is rotating quite slowly in a strong field, but at a sufficient speed to miantain such a current as will produce by reaction on the field $q$, the torque necessary to balance that transmitted from the engine.

If the ratio of the diameters of the gear wheels $g$ and $m$ is twice the ratio of the diameters of the gear wheels $h$ and $n$ which is a suitable arrangement for the purpose of the present invention, the armature $c$ will now be rotating at nearly half the speed of the shaft $a$. By applying the brake at $o$ the armature $b$ may be held stationary, when there is no longer any power transmitted electrically to the armature $c$. This is not the limit of the regulation with this system. After the field $q$ has been brought to its full strength and the field $r$ diminished to zero, it is possible to proceed further by reversing the field $r$, the brake at $o$ being now released, so that the machine $c\ r$ operates as a generator and supplies current to the machine $b\ q$ working as a motor. As a result, this latter machine now rotates in the same direction as the engine shaft $a$, and by the gradual strengthening of the field $r$ this action may be increased until the armature $b$ rotates at the same speed as the shaft $a$. In this condition the whole of the gearing contained within the fly wheel $f$ will be rotated solidly and the two shafts $a$ and $d$ and the sleeve $e$ will also have the same speed in the same direction. At this stage therefore, when it will be noted, a comparatively large amount of power is being transmitted electrically, the clutch $p$ may be engaged so that the whole transmission again becomes mechanical, thus giving a purely mechanical drive on the top speed. It is obviously possible when the clutch is disengaged to go still further in this direction to increase the speed of the vehicle, but as a rule it is convenient to make the condition above described in which the mechanical drive is possible, the highest speed. It is apparent that this arrangement results in a great increase in efficiency, since all electrical losses cease when the clutch is in action; and also what is more important, only dynamos of comparatively small output are required, since the maximum load attained just prior to the engagement of the clutch may be regarded as the limit of temporary overload for which the machines must be designed, instead of, as would otherwise be necessary, as the normal full load at which high efficiency is essential.

If it is required to reverse the direction of motion of the vehicle, it is necessary to reverse the field $r$, exciting it strongly as when starting, and then to gradually increase the strength of the field $q$ from zero also as at start. If this is done, the current in the armature $b$ reacting upon the field of the magnets $q$ will transmit a small torque through the gearing tending to turn the shaft $d$ in the direction for forward driving; but the same current flowing in the armature $c$ and reacting upon the strong field $r$ will set up a much larger torque in the opposite direction, so that the vehicle will go backward. The small contrary torque may be avoided by providing means for separating the armature $c$ and road wheel shaft from the gearing, and for holding the sun wheel $n$ stationary.

Clearly, when the full power of the engine is not required it may be throttled in any known manner just as when no system of electric transmission is employed.

With this system arranged substantially in the manner indicated, various possibilities present themselves as the result of the novel features above described. When the vehicle is running on what has been indicated as the top speed, the brake at $o$ may clearly be used as an additional brake for the whole vehicle since the power transmission is then wholly mechanical. At other times it is possible to utilize the electrical machines as brakes in substantially the manner already practiced on electric trams. The machine $c\ r$ for instance, if short circuited upon itself, may be run as a generator deriving its energy from the motion of the vehicle, and this energy may be dissipated in resistances or may be employed to drive the machine $b\ q$ as a motor against the resistance of the brake applied at $o$.

It should be noted that the above describes merely an example of the electromechanical system to which the present invention belongs. It will be readily understood that in its details this system is capable of wide variation. For example the fields $q$ and $r$ may be varied in any known manner. Again, part of the regulation at any rate might be effected, for example at starting, not by variation of the fields, but by the insertion of resistance in the armature circuit, though this would appear to be a somewhat less economical method. It is further clear that the arrangement of parts illustrated is not the only one possible. According to circumstances it may be found convenient to arrange the gearing for example between the two electrical machines, or the clutch to connect another pair of members, or the members of the gear to which the shafts $a$ and $d$ are connected might be interchanged and other variations in position may be made without involving any more than a change in the mere mechanical design of the apparatus; particularly, of course, the dynamos need not be mounted directly on the shafts which are intergeared, but may be connected with them by suitable gearing.

It will be further understood that the system as a whole, and therefore the system with the present invention embodied in it, is applicable not merely to motor vehicles, but to all cases in which analogous circumstances arise. One particular application worthy of mention is the driving of winding gear.

What I claim is:

1. In an electro-mechanical system of power transmission, the combination with a prime motor and two dynamo electric machines, of electrical connections between said machines, means for controlling said machines electrically, so as to cause first one and then the other to generate current, means for clutching the shafts of said machines together mechanically, gear wheels attached to said machines and a third gearing member joined to the prime motor, co-acting with these wheels, and tending to turn them oppositely.

2. In an electro-mechanical system of power transmission, the combination with a prime motor and two dynamo electric machines, of electrical connections between said machines, means for controlling said machines electrically, so as to cause first one and then the other to generate current, means for clutching the shafts of said machines together mechanically, gear wheels of different diameters one secured to each machine, planet pinions upon a common axle arranged to mesh respectively with said gear wheels, and a member carrying said planet pinion axle and driven by the prime motor.

3. In an electro-mechanical system of power transmission, the combination with a prime motor and two dynamo electric machines, of electrical connections between said machines, means for controlling said machines electrically, so as to cause first one and then the other to generate current, means for clutching the shafts of said machines together mechanically, gear wheels attached to said machines, a third gearing member joined to the prime motor, co-acting with these wheels, and tending to turn them oppositely, and means for holding one of the electrical machines stationary.

4. In an electro-mechanical system of power transmission, the combination of a prime motor, a member on the shaft of said motor carrying pairs of planet pinions of different diameters on common axles, sun wheels gearing with the respective planet pinions and secured upon a shaft and sleeve respectively, dynamo-electric machines having rotors mounted on said shaft and sleeve respectively, clutch members upon said shaft and sleeve adapted to engage to lock the shaft and sleeve together, electrical connections between said dynamo-electric machines, and electrical controlling means for causing said machines to act first as generator and motor and afterward as motor and generator respectively.

5. In an electro-mechanical system of power transmission, the combination of a prime motor, a member on the shaft of said motor carrying pairs of planet pinions of different diameters on common axles, sun wheels gearing with the respective planet pinions and secured upon a shaft and sleeve respectively, dynamo-electric machines having rotors mounted on said shaft and sleeve respectively, clutch members upon said shaft and sleeve adapted to engage to lock the shaft and sleeve together, a braking surface secured to said sleeve, means for causing frictional drag on said surface, electrical connections between said dynamo electric machines, and electrical controlling means for causing said machines to act first as generator and motor and afterward as motor and generator respectively.

In testimony whereof I have signed my name to this specification in the presence of two subscribing witnesses.

JOHN GODFREY PARRY THOMAS.

Witnesses:
ALBERT EDWARD O'DELL,
KENNETH JOHN THOMSON.